Nov. 12, 1940.   H. R. FOWLER   2,220,897
ELECTRIC CURRENT CONVERTER
Filed Oct. 24, 1938
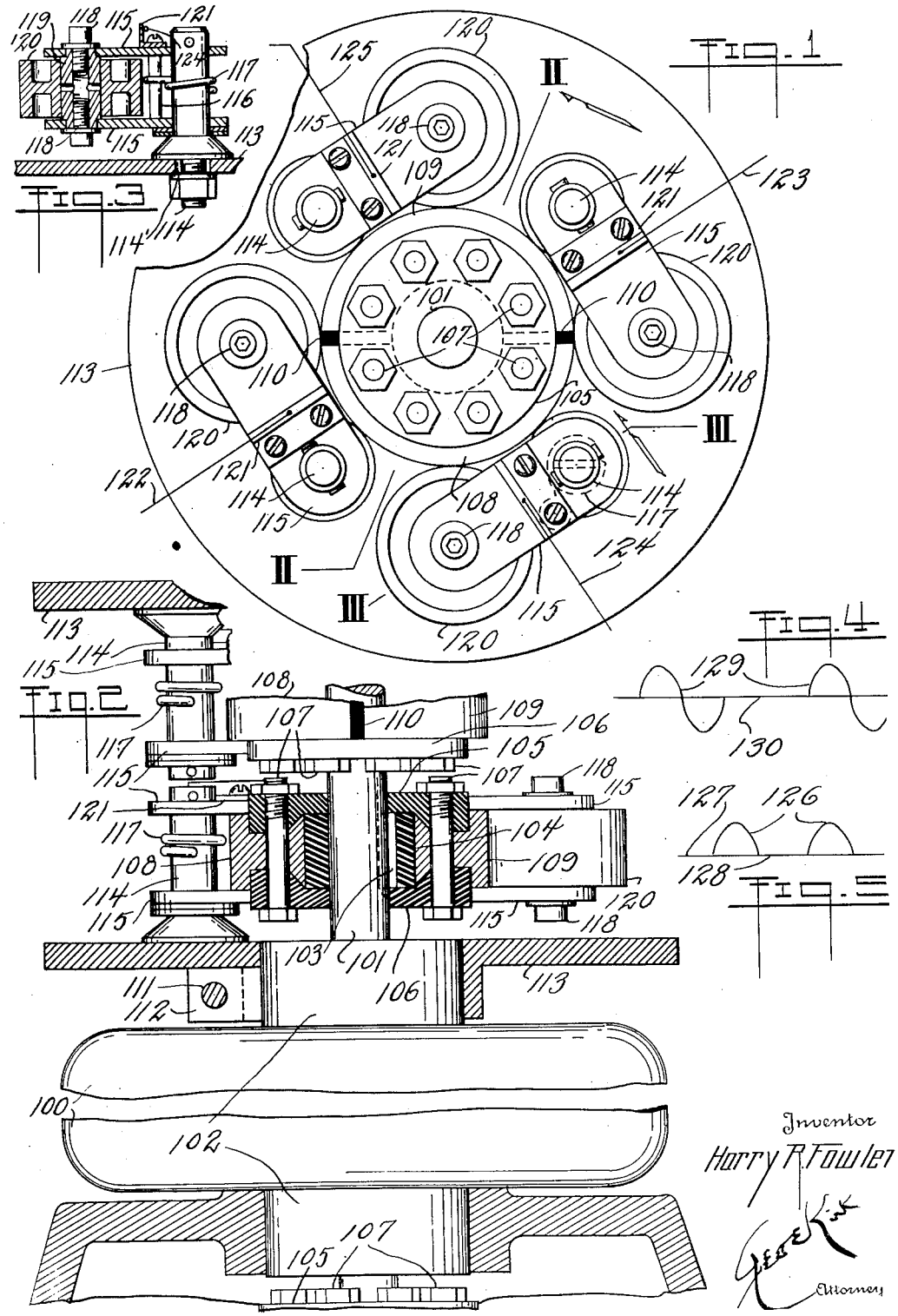
Inventor
Harry R Fowler Patented Nov. 12, 1940

2,220,897

UNITED STATES PATENT OFFICE 2,220,897

ELECTRIC CURRENT CONVERTER

Harry R. Fowler, Toledo, Ohio

Application October 24, 1938, Serial No. 236,660

4 Claims. (Cl. 175—364)

As a continuation in part of copending application for Electric current wave handling, Patent No. 2,133,980, October 25, 1938, this invention relates to features of adaptation and control responsive to frequency of oscillation of electric energy.

This invention has utility when incorporated in electric circuits, especially as having phases which may be of alternating and pulsating types, by effecting circuit breaking change in conductors at such proximity to neutral point of the voltage that loss therefrom is negligible and with practically total absence of sparking and arcing difficulties. In fact, the neutral point has been so closely approached as to bring within one per cent of the voltage.

Referring to the drawing:

Fig. 1 is an end view, with parts broken away, of an embodiment of the invention wherein the rollers are exterior of the ring and provide terminals which do not bridge from ring to ring but take the current off for supply directly to the relatively rotating contacts of the ring;

Fig. 2 is a section on the line II—II, Fig. 1, showing the motor with the contact carrier ring on its shaft as well as the frame mounting the rolling conductor means or terminals;

Fig. 3 is a section on the line III—III, Fig. 1, showing a rolling conductor mounting;

Fig. 4 is a diagrammatic view of spaced or cut up selection of supply current for delivery as a full phase; and Fig. 5 is a diagrammatic view showing spaced delivery current which is of half phase and unidirectional.

Alternating synchronous motor 100 is shown as having shaft or rotor 101 in stator frame 102. This rotor shaft 101 has anchored therewith by spline 103 insulation body 104 embraced between flanges 105, 106, by bolts 107, thereby to anchor arcuate contact segments 108, 109, spaced by insulation 110. There is thus electric conductor independence between these individual segments 108, 109. The two, of approximately 180° arc each, form a ring member or conductor means. Bolt 111 is effective to clamp frame 112 on stator projection 102 from the motor 100 and thereby carry radial frame flange 113 from which extends bolts 114 mounting parallel arms 115 pivoted from these bolts 114. Between these arms 115 is pin 116 engaged by torsion spring 117 from the bolt 114, thereby tending to throw the free ends of these parallel arms 115 toward the ring 108, 109. The free ends of these arms 115 have bolts 118 mounting sleeve 119 as a bearing for conductor roller 120.

Accordingly, the spring 117 normally throws this electrical conductor roller 120 into contact with the ring 108, 109, as rotating relatively to the frame 113. This means that this rotation of the ring 108, 109, by the motor 100 causes such motor to act in effecting rotation of these rolling conductors 120 as against the face of the ring 108, 109. The pin 116 has electrical conductor attaching claw 121. Thus, conductor lines 122, 123, may supply a phase of a single phase alternating current as a current supply, while conductor line 124 may take off say positive direct current, and line 125 be the return or negative current from such completed circuit. The other way about may be effective wherein the lines 124, 125, may supply pulsating current to be divided by the operation hereunder into alternating current, single phase as taken off by the circuit lines 122, 123. In plural phase operation, it is only necessary that there be additional flanges 113 relatively independently adjustable as to the stator 102. Clearance 114' in the flange 113 of bolts 114 allows for close angular adjustment of the separate rollers 120.

In carrying out this invention, the independent adjustments permissible for these frames 103 as to the stator 102 are desirable to fix the angular relation of the radial contact region of the rolling conductors 120 such that in the relative rotation between these rollers 120 and the ring 108, 109, the zero or neutral point of the fluctuating current be at the insulation or break 110. This effects, with the conductors for a single phase as confined to a single frame 113, a succession of current conversion graphs 126 (Fig. 5) which are symmetrical from base line 127 as directly or approximately directly adjacent for pulsating direct current.

In the instance wherein the single phase is taken to two frames and but one receiver and one supply roller as adjacent be used, there is intermission or gap 128 therebetween in permitting such current to be used as a source for reciprocating drive. This reciprocation action effect may be obtained with the motor 100, say actuated from a 60 cycle motor supply having its speed at 3600 R. P. M. However, at 1800 R. P. M., under such operation, the resultant drive in lieu of the spaced unidirectional graphs 126 (Fig. 5) may have full cycle graphs 129 (Fig. 4) with spacing 130 therebetween.

Under this set-up there is simplified showing for definitely locating the desired relation and such is effected in the rolling contact independently of arcing. However, in practice there has been advantage in election of contact-face-providing material of conductor value against disturbance in the carrying of current even up to considerable capacity under the line contact, and to this end beryllium alloy copper has been found advantageous.

What is claimed and it is desired to secure by United States Letters Patent is:

1. A converter comprising an electric motor, a shaft and housing for the motor, a ring carrying individual segmented similar extent arcuate contacts of major annular extent and fixed with the shaft, relatively narrow insulation spacers for the contacts directly therebetween, a frame anchored with the housing in fixed angular position, rolling conductor means mounted on the frame and engaging the contacts of the ring, alternating electric current supply for the motor and rolling conductor means, and additional rolling conductor current take off means engaging the ring contacts in sequence with the supply contacts and controlled by the motor for current transfer at said narrow insulation spacers.

2. A converter comprising an electric motor, a shaft and housing for the motor, a ring carrying individual segmented similar extent arcuate contacts of major annular extent and fixed with the shaft, relatively narrow insulation spacers for the contacts directly therebetween, a frame anchored with the housing in fixed angular position, rolling conductor means mounted on the frame and engaging the contacts of the ring, alternating electric current supply for the motor and rolling conductor means, additional rolling conductor current take off means engaging the ring contacts in sequence with the supply contacts and controlled by the motor for current transfer at said narrow insulation spacers, and yieldable means holding the rolling conductor means against the contacts.

3. In an electric current converter, interruption mechanism embodying at least two similar extent arcuate contact sections, relatively narrow insulation spacer sections directly therebetween to complete with the arcuate sections a closed path, relatively traveling bearings, rollers mounted by the bearings to contact in path continuity for electric current interruptions by the insulation spacing means, said rollers confining current flow interruption against bridging the spacer sections, and electric conductor connection to said rollers adapted for making circuit with said contact sections and breaking at the insulation spacing means.

4. In an electric current converter, interruption mechanism embodying at least two similar extent arcuate contact sections, relatively narrow insulation spacer sections directly therebetween to complete with the arcuate sections a closed path of approximately continuous conductor response, relatively rotating arms, rollers mounted on the arms and swingable to contact in path continuity for electric current interruptions by the insulation spacing means, and electric conductor connection to said arms adapted for coacting with the respective rollers for making circuit with said contact sections and breaking at the insulation spacing means and current carrying continuity for the respective rollers just short of obliteration of the spacer sections.

HARRY R. FOWLER.